United States Patent
Stewart et al.

(10) Patent No.: US 11,653,690 B2
(45) Date of Patent: May 23, 2023

(54) DUAL TEXTURED ANIMAL FOOD PRODUCT AND METHODS OF MANUFACTURE THEREOF

(71) Applicant: Big Heart Pet, Inc., Orrville, OH (US)

(72) Inventors: Douglas James Stewart, Rittman, OH (US); Stephen Michalak, Akron, OH (US); Binod Rijal, Akron, OH (US); Daniel Ryan Cabrera, Wadsworth, OH (US)

(73) Assignee: BIG HEART PET, INC., Orrville, OH (US)

( * ) Notice: Subject to any disclaimer, the term of this patent is extended or adjusted under 35 U.S.C. 154(b) by 627 days.

(21) Appl. No.: 16/555,784

(22) Filed: Aug. 29, 2019

(65) Prior Publication Data

US 2021/0059293 A1  Mar. 4, 2021

(51) Int. Cl.
*A23K 50/42* (2016.01)
*A23P 30/25* (2016.01)
*A23K 40/25* (2016.01)
*A23K 50/48* (2016.01)

(52) U.S. Cl.
CPC .............. *A23P 30/25* (2016.08); *A23K 40/25* (2016.05); *A23K 50/42* (2016.05); *A23K 50/48* (2016.05)

(58) Field of Classification Search
CPC ......... A23K 40/25; A23K 50/42; A23K 50/48
See application file for complete search history.

(56) References Cited

U.S. PATENT DOCUMENTS

| | | | |
|---|---|---|---|
| 4,777,058 A * | 10/1988 | Chandler | A23K 40/20 426/514 |
| 4,954,061 A * | 9/1990 | Repholz | A23K 50/42 99/450.6 |
| 6,238,715 B1 | 5/2001 | Baikie | |
| 6,254,910 B1 | 7/2001 | Paluch | |
| 6,277,420 B1 | 8/2001 | Andersen et al. | |
| 6,306,446 B1 | 10/2001 | Matthews et al. | |
| 6,344,224 B1 | 2/2002 | Bazzaro et al. | |
| 6,379,725 B1 | 4/2002 | Wang et al. | |
| 6,436,463 B1 | 8/2002 | Cheuk et al. | |
| 6,517,877 B2 | 2/2003 | Gannon | |
| 6,835,397 B2 | 12/2004 | Lee et al. | |
| 7,214,396 B2 | 5/2007 | Rivier | |
| 7,479,286 B2 | 1/2009 | Couzy et al. | |
| 7,485,330 B2 | 2/2009 | Anderson et al. | |

(Continued)

*Primary Examiner* — W A Moore
(74) *Attorney, Agent, or Firm* — Michael A. Olshavsky

(57) ABSTRACT

A co-extruded, dual-texture animal food is provided. The food has a dry outer portion partially surrounding a semi-moist inner portion. The inner portion has a higher or similar moisture content and a softer texture compared to the outer portion which has a lower moisture content and harder texture. The outer portion comprises cereal grain and a legume at about 75-85% of the weight of the outer portion, and an animal-based protein contributing to about 5-10% of the weight or more of the outer portion. The inner portion has animal-derived grease mixed with lactic acid at about 3% by weight of the inner portion, along with at least one meat comprising at least 3% by weight of the inner portion. The composition inhibits moisture transference within and between individual pieces of the food. The food is shelf stable and the inner and outer portions retain their hardness and moisture profiles, post-packaging.

15 Claims, 2 Drawing Sheets

(56) References Cited

U.S. PATENT DOCUMENTS

| | | |
|---|---|---|
| 7,651,708 B2 | 1/2010 | Schlebusch et al. |
| 7,842,329 B2 | 11/2010 | Saylock et al. |
| 7,851,001 B2 | 12/2010 | Axelrod |
| 7,867,536 B2 | 1/2011 | Kargenian |
| 7,930,996 B2 | 4/2011 | Axelrod et al. |
| 7,951,493 B2 | 5/2011 | Lin et al. |
| 7,976,884 B2 | 7/2011 | Weinberg |
| 8,128,956 B2 | 3/2012 | Torney et al. |
| 8,367,144 B2 | 2/2013 | Pater et al. |
| 8,609,166 B2 | 12/2013 | Laborbe et al. |
| 8,771,775 B2 | 7/2014 | Axelrod et al. |
| 8,776,728 B2 | 7/2014 | Xu |
| 9,072,310 B2 | 7/2015 | Harel et al. |
| 9,326,541 B2 | 5/2016 | Carrillo et al. |
| 9,339,052 B1 | 5/2016 | Schwartz |
| 9,380,802 B2 | 7/2016 | Andersen et al. |
| 9,480,275 B2 | 11/2016 | Brent, Jr. |
| 10,117,450 B2 | 11/2018 | Pibarot et al. |
| 2010/0310750 A1* | 12/2010 | She ................. A23K 20/20 426/573 |
| 2016/0219905 A1* | 8/2016 | Ichihashi ........... A23K 20/158 |
| 2020/0337335 A1* | 10/2020 | Kuerzinger ......... A23K 50/80 |

\* cited by examiner

DUAL TEXTURED ANIMAL FOOD PRODUCT AND METHODS OF MANUFACTURE THEREOF

FIELD OF THE INVENTION

The invention relates to a dual-textured animal food that is manufactured using a co-extrusion process. More specifically, the invention provides an animal food product having a harder, outer portion partially surrounding a softer, semi-moist, inner portion having a meat-based component and animal-derived grease with lactic acid, wherein each portion substantially retains its hardness, texture, and moisture content after being packaged

BACKGROUND OF THE INVENTION

Animal food intended for consumption by dogs or cats is generally classified as one of three distinct types: (1) wet (or canned) food products, (2) semi-moist or intermediate moisture food products, or (3) dry or semi-dry food products.

Canned food products consist of meat or mixtures of meat and cereal. Canned food products have a meat-like texture and a high moisture content generally in the range of 70-80% by weight. Canned food products have high animal acceptance because of their natural moisture and high meat content, which provide a palatable texture, taste, and aroma. Because of the high moisture content, canned food products must be heat sterilized in hermetically-sealed containers, such as cans, to inhibit spoilage and to provide a reasonable shelf-life.

Semi-moist or intermediate moisture food products are mixtures of meat, protein meals, and cereals. Semi-moist or intermediate moisture food products have a moisture content in the range of 12-35% by weight. The moisture content provides the semi-moist or intermediate moisture food product with a soft texture, like cooked meat. The soft texture increases the palatability of the food product. To combat spoilage, preservation of semi-moist or intermediate moisture food products is achieved by the addition of humectants, such as sugars, food syrups and polyhydric alcohols, which bind water, and thus reduce the water activity of these food products to a level that inhibits growth of bacteria. Furthermore, preservatives, acids, and/or an antimicrobial agent may be added to inhibit the growth of yeasts, molds, and other microorganisms.

Dry or semi-dry foods consist of mixtures of meat and/or meat meal and cereals and have a low moisture content—typically below 12% by weight. Dry or semi-dry foods generally have a hard, crunchy texture and a high nutritional and calorific value, and can provide a complete balanced diet to the animal. Dry or semi-dry foods are shelf stable because of the low moisture content. Thus, dry or semi-dry foods can be placed in inexpensive packaging, such as paper or cardboard containers. Dry or semi-dry foods generally have low palatability for animals. To make dry or semi-dry food products more appetizing, liquids can be added immediately before consumption. However, the addition of a liquid to dry or semi-dry foods may not increase palatability, and the liquid can cause the dry or semi-dry food products to turn into a mushy, unappealing conglomeration. Additional attempts have been made to increase the palatability of dry and semi-dry products by coating them with a meat slurry. However, meat slurry coatings negatively impact the shelf stability of dry or semi-dry food products because moisture transfers from the meat slurry coating to the food products. This increases the likelihood of bacterial or fungal growth on the food product.

In addition to the three categories outlined above, animal foods, particularly dog foods, can be divided into two further subclasses, which are foods designed as main meals and foods designed as treats. While treats may be individually wrapped to combat moisture transference, main meals are typically packaged in bulk. It is difficult to combat moisture transference in bulk packaging.

Generally, semi-moist or intermediate moisture products are not co-packaged with dry or semi-dry products because the moisture content of the two different products will seek to reach equilibrium through moisture transference, which can cause dry or semi-dry products to absorb water and become mushy, and then oxidize or become rancid. For this reason, dry and semi-moist products are not normally co-packaged in a container, nor are they combined into a single product by coextrusion or other forming technique. If semi-moist or intermediate moisture products are co-packaged with dry or semi-dry products, desiccant pouches could be used to try to mitigate moisture transference between products with different moisture content within a package. However, a desiccant pouch simply absorbs free moisture in the package as a whole, and it does not control or maintain differences in moisture between packaged food products having different initial moisture contents. Also, desiccant pouches enclose a toxic adsorptive material, if consumed, and therefore are not desirable to include in food packaging. Consequently, pet owners are unable to realize the advantages of combining product types with different moisture contents into a single package, such as the nutritional value of a dry product combined with the enhanced palatability of a semi-moist product.

Accordingly, there is a need for a combination animal food product comprising a dry outer layer partially surrounding a semi-moist inner layer, which includes a meat-based component, that retains its dual-texture composition after being packaged and that is shelf stable. Such a combination animal food product can have dual-texture compositions that minimize moisture transference between the layers without the aid of desiccants, thereby allowing the combination product to be packaged and sold without product degradation (e.g., turning to mush), spoilage (i.e., bacteria or fungal growth), or both.

SUMMARY OF THE INVENTION

The invention overcomes the challenges of co-packaging animal food products having different textures and/or moisture content, as well as manufacturing a co-extruded, dual-texture animal food product. To achieve solutions for the foregoing needs and to provide other advantages, and according to the purpose of the invention as embodied and described herein, the invention provides a co-extruded, dual-texture animal food product having a dry outer portion, which has a first texture, partially surrounding a semi-moist inner portion comprising a meat-based component and animal-derived grease, which has a second texture. Moisture transference between the inner and outer portions is minimized or eliminated by the combination of unique product compositions during co-extrusion, whereby the textures of the inner and outer portions retain their individual hardness and moisture content, even after being packaged and up to the time of consumption by an animal. Consequently, the compositions of the co-extruded, dual-texture animal food product reduces or eliminates the potential for texture degradation, oxidation and spoilage of the animal food product post-packaging.

The invention provides a co-extruded animal food product with an outer portion having a first texture and a hardness factor of about 3-10 Newtons, partially surrounding a softer inner portion having a second texture and a harness factor of about 1-7 Newtons. The hardness factor associated with the inner portion is less than the hardness factor associated with the outer portion. In various embodiments, the outer portion has a hardness factor of about 3.5-7 Newtons, about 4-6 Newtons, about 4.5-5.5 Newtons, or about 5.5 Newtons; and the inner portion has a hardness factor of about 1.5-7 Newtons, about 3-6 Newtons, about 4-5 Newtons, or about 4.5 Newtons. In certain embodiments, the ratio between the hardness factor of the inner portion and the hardness factor of the outer portion is in a range of about 1:1.1 to 1:3.

The outer portion has a moisture content of about 8-12% by weight and comprises at least one cereal grain and a legume in combination at about 75-85% by weight and an animal-based protein at about 5-10% by weight. The outer portion is formed from an expanded dough. The inner portion has a moisture content of about 11-20% by weight and comprises at least one animal-derived grease mixed with lactic acid at about 3% or more by weight and at least one meat-based component at about 3% or more by weight. The inner portion is formed from a non-expanded dough. The moisture content of the inner portion is either greater than or similar to the moisture content of the outer portion. In various embodiments, the outer portion has a moisture content of about 10-12%, or about 12%, by weight of the outer portion, and the inner portion has a moisture content of about 15-17%, or about 16%, by weight of the inner portion.

Cereal grains are included in the compositions of the outer portion and the inner portion. In embodiments, the cereal grains can be corn, whole corn kernels, wheat, whole wheat, wheat middlings, or other cereal grains. Legumes are also included in the compositions of the outer portion and the inner portion. In embodiments, the legumes can be soybean, soybean meal, or other legumes including, but not limited to, beans or peas. In addition, vitamins, minerals, flavorings, and/or preservatives can be included in the compositions of the outer portion and the inner portion. Finally, an acid or acid blend can be included in the compositions of the inner portion and the outer portion.

In embodiments, a mixture of animal-derived grease, i.e., choice white grease, and lactic acid, can be included in the composition of the inner component, along with a meat-based component, e.g., beef. Additionally, the mixture of animal-derived grease, i.e., choice white grease, and lactic acid can also be applied to the external surface of the animal food product.

The dual-texture compositions minimize or eliminate moisture transference between the outer portion and the inner portion, as well as between individual pieces of the animal food product. This helps the animal food to resist degradation, oxidation, and spoilage, and to be shelf stable.

In addition, a process for manufacturing the dual-textured animal food product is disclosed. The process comprises forming in a first extruder, a first dough comprising animal meat, a plant-based starch, plant-based protein, animal-derived grease mixed with lactic acid, and a humectant. The process also comprises separately forming, in second extruder, a second dough comprising a cereal grain, a legume or meal of a legume, and an animal-derived protein. Then, the process comprises co-extruding the second dough around the first dough to form a co-extrudate, the co-extrudate comprising an inner portion of the first dough and an outer portion of the second dough, wherein the outer portion has a first texture with a hardness factor of about 3-10 Newtons and the inner portion has a second texture with a hardness factor of about 1-7 Newtons, whereby the hardness factor associated with the outer portion is greater than the hardness factor associated with the inner portion. The co-extrudate is then cut by a face cutter or similar cutting mechanism into pieces of the dual-texture, animal food product.

In various embodiments of the process, the first extruder is a twin-screw extruder, and the second extruder is a single screw extruder that includes a manifold. The manifold is used for wrapping the second dough around the first dough before the step of co-extruding the first dough and the second dough to form the co-extrudate, which is later cut into pieces of the animal food product.

In various embodiments, after the pieces of the dual-texture animal food product are air-dried, the animal food product is packaged in commercial packaging. The commercial packaging can be a hermetically-sealed container. The commercial packaging can be selected to provide shelf stability of the packaged animal food product, whereby the inner portion and the outer portion of the animal food substantially retaining their individual textures, hardness factors, and moisture content after packaging.

In summary, the solutions provided by the invention provide the nutritional advantages of a dry food product with the palatability advantages of a semi-moist food product. This results in a co-extruded, dual-texture animal food product that is shelf stable and does not degrade, oxidize, or spoil inside the package. These advantages are derived, at least in part, from the unique compositions associated with the outer portion and the inner portion.

BRIEF DESCRIPTION OF THE FIGURES

Additional aspects, features, and advantages of the invention, as to its structure, composition, and methods will be understood and become clearer when the invention is considered in view of the following brief description of the figures made in conjunction with the accompanying drawings, wherein.

DETAILED DESCRIPTION OF THE INVENTION

Figure 1:
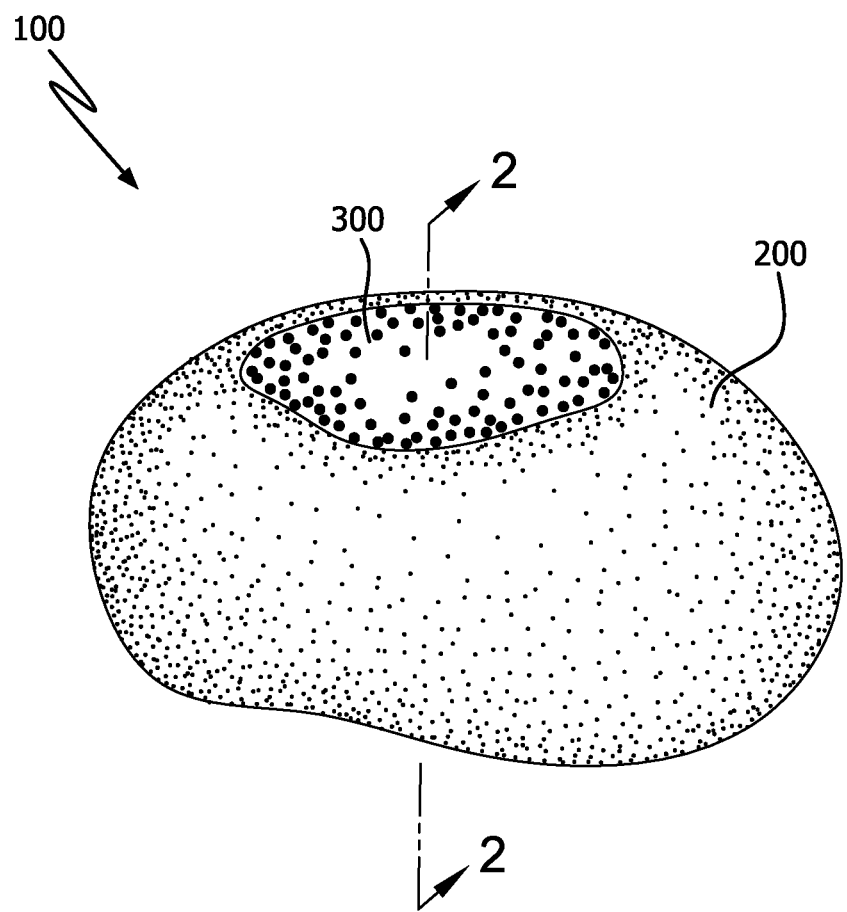
FIG. 1 shows a front perspective view of a dual-textured, animal food product.

Illustrative and alternative embodiments of a dual-texture, animal food product 100 having a harder, outer portion 200 partially surrounding a softer, inner portion 300 are described in detail with reference being made to the figures of this application. While similar aspects of embodiments of the invention are featured throughout this disclosure, these similarities may be repeated within the context of the various embodiments of the invention.

The animal food product described herein is intended to be consumed by companion animals or pets such as dogs or cats and provided to companion animals by their care-givers.

The terms "shelf stable" or "shelf stable food" generally refer to an animal food product that is commercially processed and can be safely stored at room temperature in a sealed container. This includes animal food products that have been processed so that they can be safely stored at room or ambient temperature for a usefully long shelf life. In the context of this invention, an animal food product is considered shelf stable if it can last without degradation, oxidation, or spoilage (a) about 3 months or longer if stored at ambient temperature, or (b) about 4 months or longer if stored under refrigerated conditions.

The terms "texture" or "food texture" refers to the rheological and structural (geometrical and surface) attributes of an animal food product perceptible by sensory experiences originated from receptors of animals during the eating process of the animal food product. Texture and structure are linked properties of animal food products. Food texture largely correlates with the oral sensory perception of an animal while eating, primarily in the form of biting, chewing, etc., that involves deformation, fracturing, and breakage of food, and can directly relate to the density, composition, physical structure, moisture content, and mechanical properties of an animal food product. Regarding the dual-texture animal food product, the harder texture of the outer portion 200 and the softer texture of the inner portion 300 were measured by compression testing using a TA.XT Plus Texture Analyzer fitted with a 1 mm needle probe (TA-51, Texture Technologies) operated at a trigger force of 5 g with a test speed of 0.5 mm/sec. The measured absolute peak force is the value used to define the hardness factors of the outer portion 200 and the inner portion 300. Measurements of the peak force were taken by forcing the needle probe perpendicularly into the surface of samples of the animal food product 100. During testing, the needle probe was forced into each sample at a distance equal to about 50% of the height of the sample. Multiple measurements of peak force were taken at different points of the external surfaces of the outer portion 200 and the inner portion 300 to determine the hardness factor of the outer portion 200 and the inner portion 300.

The dual-texture animal food product 100 is shelf stable and produced by a co-extrusion process. The product 100 has both a dry outer portion 200 partially surrounding a semi-moist inner portion 300 having a meat-based component and animal-derived grease mixed with lactic acid. The unique compositions associated with the inner portion 300 and outer portion 200 can minimize or eliminate moisture transference between the portions 200, 300. This results in the inner portion 300 and the outer portion 200 retaining their individual hardness factors after packaging, with the outer portion 200 being harder than the softer inner portion 300. Furthermore, by reducing the moisture transference, the potential for degradation, oxidation and spoilage of the co-extruded product 100 is reduced, as well. Consequently, the animal food product 100 combines the nutritional value of a dry food product with the palatability of a semi-moist product.

In various embodiments, the outer portion 200 comprises from about 55-75% by weight of the animal food product 100, while the inner portion 300 comprises between about 25-45% by weight of the animal food product 100. In a non-limiting embodiment, the outer portion 200 comprises about 70% by weight of the animal food product 100, and the inner portion 300 comprises 30% by weight of the animal food product.

In one optional embodiment, a mixture of an animal-derived grease and lactic acid is externally applied to the animal food product 100 after it has been co-extruded. Such a grease mixture may comprise about 99.75 wt % fat, e.g., choice white grease, and about 0.25 wt % lactic acid. After application, such a coating may comprise from about 2.5-3.5% by weight of the animal food product 100. Without being bound by any theory of operability, the application of the grease mixture to the animal food product 100 can help to protect against oxidation and rancidity of the animal food product 100.

The inclusion of animal-derived and plant-derived proteins and fat ingredients, as well as plant-derived starches and fibers, in the compositions of the outer portion 200 and inner portion 300 of the animal food product 100 can affect the texture properties and moisture content, which are disclosed herein. The protein-containing and starch-containing ingredients should be selected together with the other ingredients of the inner and outer portions 300, 200 to yield an animal food product 100 having the desired properties.

Any of a wide variety of agents known to be desirable in animal food products 100 can be included in the outer portion 200 and inner portion 300 of the animal food product 100. Examples of suitable additional ingredients include vitamins, minerals, humectants, acids, flavorants, aromants, colorants, and preservatives. Vitamins, minerals, humectants, acids, flavorants, aromants, colorants, and preservatives should be selected and formulated to be present in amounts that achieve their respective functionalities, but also should be selected to be suitable for consumption by the animal. Preservatives and acids, for example, can be selected to inhibit microbial growth or spoilage of packaged animal food product 100 during storage.

Figure 2:
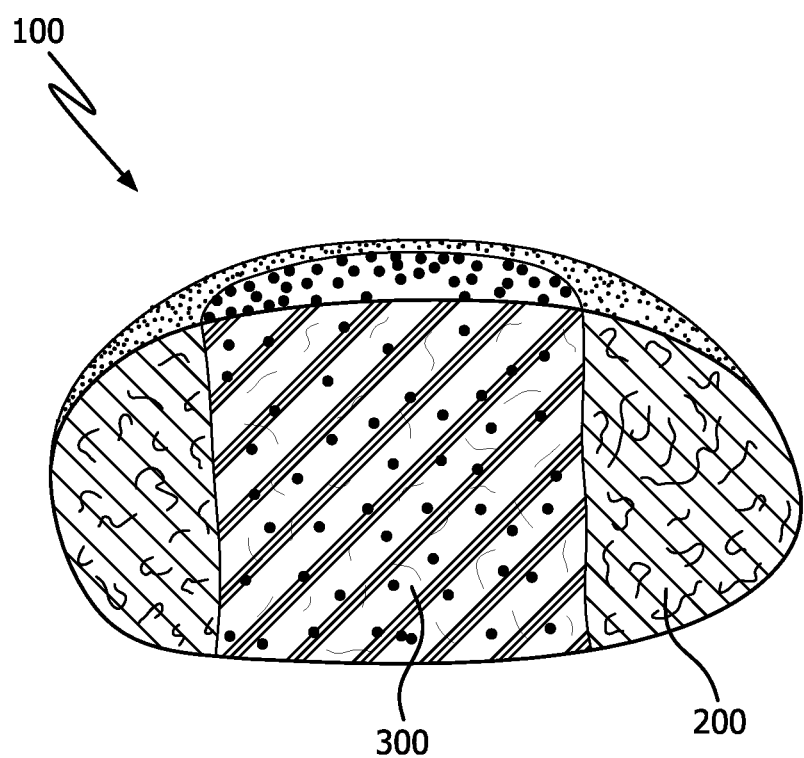
FIG. 2 shows a cross-sectional view along the line 2-2 of the dual-textured, animal food product of FIG. 1.

Referring to FIGS. 1-2, the compositions of the outer portion 200 and inner portion 300 of the animal food product 100 are described further as follows.

The composition of the outer portion 200 comprises a cereal grain, a legume, and an animal-based protein.

The outer portion 200 comprises cereal grain at about 46-56% by weight of the outer portion 200. In an embodiment, the animal food product 100 includes at least one cereal grain. The precise identity, form, and properties of any cereal grain in the animal food product 100 is not critical. The cereal grain can be corn, whole corn, wheat, whole wheat, or wheat middlings. The cereal grain can be selected as meal or flour obtained by grinding cereal grains. The cereal grains provide a starch component in the outer portion 200. For example, starch may be provided by corn or wheat. By way of example, corn is composed of almost 100% amylopectin and can be used to boost the amylopectin content of a starch-containing composition. By way of converse example, many high amylose content starches (e.g., high-amylose corn starches having an amylose content of 75% or more) are known, and these can be used to boost the amylose content of a starch-containing composition. Wheat starch, like the other cereal grain starches, consists primarily of amylopectin with lower amounts of amylose, averaging about 25% by weight (range of about 20-30% by weight). Amylose and amylopectin proportions can be obtained by selecting a starting material having starch in the selected proportion, by mixing starches from various starting materials, or by supplementing starch with other ingredients.

In exemplary embodiments, the outer portion 200 includes the following cereal grains: (1) whole corn from about 40-45% by weight of the outer portion 200, preferably about 42-43% by weight of the outer portion 200, (2) wheat middlings from about 3-8% by weight of the outer portion 200, preferably about 5-6% by weight of the outer portion 200, and (3) whole wheat (bulk) from about 3-8% by weight of the outer portion 200, preferably about 4.5-5.5% by weight of the outer portion 200.

The cereal grain can also be selected to provide a plant-derived protein. In a non-limiting embodiment, wheat, whole wheat, or wheat middlings are selected for providing a plant-based protein in addition to providing a starch component.

The outer portion 200 comprises a legume. The precise identity, form, and properties of any legume in the animal food product 100 is not critical. In a non-limiting embodiment, the legume can be soybeans or soybean meal. For example, the legume can be soybean meal with 48% protein, or, conversely, soybean meal with 52% protein. In an exemplary embodiment, the outer portion 200 includes soybean meal with 48% protein. In embodiments, the outer portion 200 comprise a legume at about 25-30% by weight, or preferably about 28-29% by weight, of the outer portion 200.

The outer portion 200 comprises animal-based proteins. The source of the animal-based protein used for the animal food 100 is not critical and a skilled artisan is able to utilize protein obtained from any of a wide variety of sources to form the animal food 100 described herein. The protein source can, for example, be relatively pure and well-characterized, such as casein and albumin preparations made from milk and eggs, respectively, or they can be less pure and well-characterized mixtures, such as protein-containing waste (or by-product) streams from meat-processing operations. The animal-based protein may also be meat meals made from, for instance, ground bones, tendons and the like. The animal-based protein should be suitable for consumption by the target animal (at least following processing of the protein into the animal food 100) and is preferably digestible by the target animal. Preferably, the protein source is one that is considered appetizing by the target animal, such as chicken, beef, or pork by-products for animal food intended for dogs. Protein isolates, such as those derived from animal tissues or eggs can be used. The animal-based protein comprises from about 5-15% by weight of the outer portion 200. For example, the animal-based protein may comprise from about 8-12% by weight of the outer portion 200, preferably about 9-10% by weight of the outer portion 200.

The outer portion 200 also comprises vitamins, minerals, and flavorants. These components can be provided in dry or liquid form and can be selected to include ingredients that are beneficial to the health or hygiene of the animal or increase the palatability, nutrition, shelf-life, or appearance of the animal food product 100 without substantially affecting its physical properties, e.g., without substantially increasing the moisture transference between the inner portion 300 and the other portion 200. Examples of such ingredients include vitamins, minerals, and flavorants. To the extent that any such ingredient is included in the animal food product 100 affects a desired physical property of the animal food product 100, the content of one or more of cereal grains, legumes, animal-based protein, humectant, or animal-derived grease in the formulation can be adjusted to account for such effects and for maintaining the properties of the animal food product 100 within desired ranges.

Any vitamin, mineral, or other nutrient included in the animal food product 100 should be selected to be present in an amount or concentration suitable for ingestion by the target animal. A wide variety of such nutrients are known for animals, and their selection and dosing for consumable compositions such as the animal food product 100, as described herein, is within the knowledge of a skilled artisan in the field. For example, at least one of the following vitamins, minerals, or flavorants may be included in the animal food product 100: (1) calcium carbonate, (2) choline chloride, (3) salt, (4) titanium dioxide, (5) DL-Methionine, and (6) prime-rib flavor.

In embodiments, the vitamin(s), mineral(s), and flavorant(s) comprise from about 0.6-2.9% by weight of the outer portion 200, preferably about 1.5% by weight of the outer portion 200.

The outer portion 200 further comprises at least one colorant. Colorants should be selected and formulated to be present in amounts that are enough to achieve their respective functionalities, but also should be selected to be suitable for consumption by the target animal and so that they do not leave undesirable stains, aromas, or other residue on surfaces contacted by the animal food product 100. For example, at least one of the following colorants may be included in the animal food product 100: (1) caramel liquid 2X, or (2) red color solution. In such embodiments, the colorant comprises from about 1-4% by weight of the outer portion 200, preferably about 2-3% by weight of the outer portion 200.

The outer portion 200 comprises at least one acid or preservative. Such acid(s) or preservative(s) may extend the shelf life of the animal food product 100 after it is packaged. In an exemplary embodiment, the outer portion 200 includes the following acid(s) or preservative(s): (1) hydrochloric acid from about 0.5-1.5% by weight of the outer portion 200, and (2) a sorbic acid blend from about 2-5% by weight of the outer portion 200. Other acids suitable for animal consumption can be used and include, but are not limited to, phosphoric acid and potassium sorbate. In such embodiments, the acid(s) or preservative(s) comprise about 2.5-6.5% by weight of the outer portion 200. For example, the acid(s) or preservative(s) may also comprise about 3.5-4.5% by weight of the outer portion 200.

TABLE 1

Ingredient Profile of Outer Portion of Final Product

| Ingredient | Target (wt %) | Range (wt %) |
| --- | --- | --- |
| Cereal Grains | 52-54 | 50-55 |
| Legume | 28-29 | 25-30 |
| Beef & Bone Meal | 9-10 | 8-12 |
| Acid/Preservative | 3.5-4.5 | 3-5 |
| Other Ingredients (Flavor, minerals, vitamins) | 0-4 | 0-5 |

The composition of the outer portion 200 provides a beneficial nutritional profile. This profile includes: (1) protein comprising from about 19-24% by weight of the outer portion 200; (2) starch comprising from about 35-45% by weight of the outer portion 200; (3) fiber comprising from about 1-5% by weight of the outer portion 200; and fat comprising from about 1-3% by weight of the outer portion 200.

TABLE 2

Nutritional Profile of Outer Portion of Final Product

| Nutritional Profile | Target (wt %) | Range (wt %) |
| --- | --- | --- |
| Protein | 21-23 | 19-24 |
| Starch | 40-41 | 35-45 |
| Fiber | 2.5-2.5 | 1-5 |
| Fat | 1.5-2.5 | 1-3 |
| Acid/Preservative | 3.8-4.2 | 3.5-4.5 |
| Water Content | 15-16 | 14-17 |

TABLE 2-continued

Nutritional Profile of Outer Portion of Final Product

| Nutritional Profile | Target (wt %) | Range (wt %) |
|---|---|---|
| Other Ingredients (flavor, color, mineral, vitamin) | 3-4 | 2.5-4.5 |

The composition of the outer portion 200 provides a harder texture characterized by a measurable hardness factor ranging from about 3-10 Newtons. In certain embodiments, the hardness factor of the outer portion 200 ranges from (1) about 3.5-7 Newtons, (2) about 4-6 Newtons, or (3) about 4.5-5.5 Newtons. For example, the hardness factor may be about 5.5 Newtons.

TABLE 3

Measured Hardness of Outer Portion of Final Product

| Reading Number of Outer Portion | Absolute Peak Force (Newtons) - Example 1 | Absolute Peak Force (Newtons) - Example 2 | Absolute Peak Force (Newtons) - Example 3 |
|---|---|---|---|
| 1 | 2.768 | 3.780 | 7.453 |
| 2 | 4.011 | 3.005 | 10.590 |
| 3 | 5.303 | 4.600 | 10.420 |
| 4 | 4.300 | 4.228 | 7.836 |
| 5 | 5.178 | 3.731 | 9.364 |
| 6 | 3.003 | 2.205 | 12.666 |
| 7 | 3.763 | 4.278 | 7.519 |
| 8 | 2.183 | 3.337 | 12.943 |
| 9 | 4.649 | 2.836 | 11.866 |
| 10 | 2.606 | 3.288 | 9.560 |
| 11 | 4.719 | n/a | n/a |
| 12 | 3.811 | n/a | n/a |
| 13 | 4.669 | n/a | n/a |
| Average: | 3.920 | 3.529 | 10.002 |
| Standard Deviation | 1.014 | 0.738 | 2.047 |
| Coefficient of Variation | 25.855 | 20.922 | 20.421 |

The outer portion 200 also has a moisture content of about 8-12% by weight of the outer portion 200. In certain embodiments, the moisture content of the outer portion 200 ranges from about 10-12% by weight of the outer portion 200. For example, the moisture content of the outer portion 200 may be about 12% by weight of the outer portion 200.

Referring to FIGS. 1-2, the inner portion 300 is partially surrounded by the outer portion 200 of the animal food product 100. The composition of the outer portion 200 comprises a cereal grain, a legume, an animal-based protein, a meat-based component, a humectant, and animal-derived grease.

Like the outer portion 200, the inner portion 300 comprises at least one cereal grain. The cereal grain(s) can comprise about 27-38% by weight of the inner portion 300, or about 30-35% by weight of the inner portion 300. In an exemplary embodiment, the inner portion 300 includes the following cereal grains: (1) whole corn from about 24-28% by weight of the inner portion 300, (2) wheat middlings from about 2-5% by weight of the inner portion 300, and (3) whole wheat from about 1-5% by weight of the inner portion 300.

Like the outer portion 200, the inner portion 300 comprises at least one legume at about 15-20% by weight of the inner portion 300, or about 16-18% by weight of the inner portion 300. In an embodiment, the inner portion 300 comprises soybean meal with 48% protein from about 15-20% by weight of the inner portion 200, or about 16-18% by weight of the inner portion 300.

Like the outer portion 200, the inner portion 300 comprises an animal-based protein. In an embodiment, the animal-based protein is about 4-8% by weight of the inner portion 300, or about 5-7% by weight of the inner portion 300.

The inner portion 300 comprises a meat-based component. The term "meat-based component" is used to refer to the flesh of cattle, swine and sheep, and refers also to the flesh of other mammals. The term also refers to those non-rendered parts of the carcasses of slaughtered animals such as liver, kidney, heart, spleen, tongue, trimmings, lungs and skins. For example, the meat incorporated into the inner portion 300 may be beef at about 90% by weight. Furthermore, the meat may be incorporated in either chunks or a slurry of comminuted meat that is partially digested with an enzyme (e.g., LIQUIPANOL® T100). The meat-based component comprises about 15-20% by weight of the inner portion 300, about 16.5-17.5% by weight of the inner portion 300. Alternatively, poultry or fish can be used in place of the meat-based component according to the disclosed weight proportions of the meat-based component relative to the inner portion 300.

The inner portion 300 comprises at least one humectant. The identity, form, and properties of the humectant included in the animal food product 100 is not critical. For example, the humectant can be one or more of glycerol, propylene glycol, or other known humectants, such as sugars or food syrups, e.g., corn syrup. Such humectant(s) can assist with shelf stability by binding water and thus reducing the moisture to a level at which bacteria are unable to grow. The humectant(s) may also be combined with an antimycotic agent, such as potassium sorbate, which inhibits the growth of yeasts and molds. Without being bound by any theory of operability, the humectant in the inner portion 300 may assist in reducing moisture transference between the outer portion 200 and the inner portion 300 of the animal food 100 and between the individual pieces of the animal food product 100. In an embodiment, the humectant comprises about 15-17% by weight of the inner portion 300.

The inner portion 300 comprises an animal-derived grease mixed with lactic acid. The precise identity, form, and properties of any animal-derived grease included in the animal food 100 is not critical. For example, the animal-derived grease can be one or more of pork fat, chicken fat, poultry fat, lamb tallow or beef tallow, or a combination thereof. One example of a commercially available pork fat that may be used is choice white grease. Other animal-greases that may be used include goose fat and duck fat. In embodiments, the animal-derived grease is mixed with lactic acid to form a grease mixture. The grease mixture may comprise about 99.75 wt % fat and about 0.25 wt % lactic acid. Without being bound by any theory operability, the animal-derived grease mixture in the inner portion 300 and externally applied to the animal food 100 may assist in reducing moisture transference between the outer portion 200 and the inner portion 300 of the animal food product 100 and between the individual pieces of the animal food product 100.

Like the outer portion 200, the inner portion 300 comprises at least one acid or preservative. In such embodiments, the acid(s) or preservative(s) comprise from about 2-4% by weight of the inner portion 300. For example, the acid(s) or preservative(s) may comprise from about 2.5-3.5% by weight of the inner portion 300. Furthermore, the inner portion 300 can include the following acid(s) or preservative(s): (1) hydrochloric acid from about 0.5-1.5% by weight of the inner portion 300, and (2) a sorbic acid blend from about 1.5-2.5% by weight of the inner portion 300.

Like the outer portion 200, the inner portion 300 further comprises at least one colorant. In embodiments, the at least one colorant comprises from about 2.5-4% by weight of the inner portion 300.

Like the outer portion 200, the inner portion 300 also comprises vitamins, minerals, and flavorants. In embodiments, the vitamins, minerals, and flavorants comprise from about 0.5-3% by weight of the inner portion 300.

TABLE 4

Ingredient Profile of Inner Portion of Final Product

| Ingredient Profile | Target (wt %) | Range (wt %) |
|---|---|---|
| Cereal Grains | 32.5 | 30-35 |
| Legume | 17.5 | 15-19 |
| Beef & Bone Meal | 5.5 | 4-7.5 |
| Humectant (propylene glycol) | 16.5 | 15-18 |
| White grease w/lactic acid | 3 | 2.5-3.5 |
| Meat Slurry | 15.75 | >9.5 |
| Acid/Preservative | 3 | 2.5-3.5 |
| Other Ingredients (Flavor, minerals, vitamins) | 4 | 3-5 |

The inner portion 300 is semi-moist and has a second, softer texture with a hardness factor ranging from about 1-7 Newtons. In certain embodiments, the hardness factor of the inner portion 300 ranges from: (1) about 3-6 Newtons or (2) about 4-5 Newtons. For example, the hardness factor of the inner portion 300 may be about 4.5 Newtons. The hardness factor of the inner portion 300 is less than the hardness factor of the outer portion 200.

TABLE 5

Measured Hardness of Inner Portion

| Reading Number | Absolute Peak Force (Newtons) - Example 1 | Absolute Peak Force (Newtons) - Example 2 | Absolute Peak Force (Newtons) - Example 3 |
|---|---|---|---|
| 1 | 3.683 | 0.888 | 4.899 |
| 2 | 3.618 | 1.743 | 7.299 |
| 3 | 3.641 | 1.187 | 6.150 |
| 4 | 2.500 | 1.958 | 8.641 |
| 5 | 2.945 | 1.421 | 10.793 |
| 6 | 3.178 | 1.706 | 4.950 |
| 7 | 3.965 | 1.819 | 8.001 |
| 8 | 3.484 | 1.376 | 8.772 |
| 9 | 3.120 | 1.618 | 5.891 |
| 10 | 2.799 | 1.464 | 6.861 |
| Average | 3.293 | 1.518 | 7.226 |
| Standard Deviation | 0.460 | 0.319 | 1.867 |
| Coefficient of Variation | 13.962 | 21.047 | 25.845 |

The inner portion 300 also has a moisture content of about 12-20%/by weight of the inner portion 300. In certain embodiments, the moisture content of the inner portion 300 ranges from about 12-18% by weight of the inner portion 300 or about 15-17% by weight of the inner portion 300. For example, the moisture content of the inner portion 300 may be about 16% by weight of the inner portion 300.

The combination of ingredients in the inner portion 300 provides a beneficial nutritional profile. This profile includes: (1) protein comprising from about 14-18% by weight of the inner portion 300; (2) starch comprising from about 22-26% by weight of the inner portion 300; (3) fiber comprising from about 1-4% by weight of the inner portion 300; and (4) fat comprising from about 4-10%/by weight of the inner portion 300.

TABLE 6

Nutritional Profile of Inner Portion of Final Product

| Nutritional Profile | Target (wt %) | Range (wt %) |
|---|---|---|
| Protein | 16 | 14-18 |
| Starch | 24 | 22-26 |
| Fiber | 2.5 | 1-4 |
| Fat | 7 | 4-10 |
| Acid/Preservative | 3 | 2.5-3.5 |
| Water Content | 18.5 | 15-20 |
| Other Ingredients (flavor, color, mineral, vitamin) | 4 | 3-5 |

In embodiments, the animal food product 100 comprises an ingredient profile as set forth in Table 7.

TABLE 7

Ingredient Profile of Animal Food Product

| Ingredient | Profile 1 (wt %) | Profile 2 (wt %) | Profile 3 (wt %) | Range (wt %) |
|---|---|---|---|---|
| Cereal Grain (Corn, whole, yellow; wheat midds; whole wheat (bulk)) | 46.5 | 45 | 47.5 | 45-50 |
| Legume (soybean meal (48%)) | 24.4 | 26 | 25 | 20-30 |
| Meaty Middle (meat) | 4.5 | 4.0 | 4.6 | >3 |
| Animal-based protein meal | 9.6 | 9.8 | 9.5 | 6-11 |
| Flavor | 0.3 | 0.3 | 0.195 | 0.05-0.35 |
| Humectant (propylene glycol; corn syrup (48%)) | 5 | 5.4 | 4.8 | 2-7 |
| Choice White Grease w/lactic acid (0.25 wt %) | 4.3 | 4.2 | 4.4 | 2-7 |
| Acid (HCl; sorbic acid blend) | 3.5 | 3.2 | 3.0 | 2.5-3.5 |
| Color | 1.195 | 1.195 | 0 | 0.5-2.5 |
| Mineral | 0.5 | 0.6 | 0.5 | 0.2-0.8 |
| Vitamin | 0.2 | 0.3 | 0.5 | 0.1-0.3 |
| Preservative (BHA 50%) | 0.005 | 0.005 | 0.005 | 0.002-0.008 |
| TOTAL | 100 | 100 | 100 | 100 |

In embodiments, the animal food product 100 comprises a nutritional profile as set forth in Table 8.

TABLE 8

Nutritional Profile of Animal Food Product

| Nutritional Profile | Target (wt %) | Range (wt %) |
|---|---|---|
| Starch | 35 | 30-40 |
| Protein | 20 | 15-25 |
| Fat (including grease) | 7 | 5-10 |
| Fiber (total) | 4 | 0.1-4 |
| Meat | 4.5 | 3 (or more) |

A process for extruding the animal food product 100 is also disclosed.

The process comprises forming in a first extruder, a first dough comprising animal meat, a plant-based starch, plant-based protein, animal-derived grease mixed with lactic acid, and a humectant. The first dough may be formed using any of the formulas set forth in Table 9. The first dough is a non-expanded dough formed at a temperature in a range of about 195-205° F.

TABLE 9

Ingredient Formulations Used to Form First Dough

| Ingredient | Formula 1 (wt %) | Formula 2 (wt %) | Formula 3 (wt %) | Range (wt %) |
|---|---|---|---|---|
| Corn, Yellow #2 (whole) | 26 | 27 | 25.6 | 24-28 |
| Soybean Meal 48% | 17.5 | 18 | 18.2 | 15-20 |
| Beef & Bone Meal | 5.5 | 6 | 6.2 | 4-8 |
| Wheat Midds Bulk | 3.5 | 4 | 3.6 | 2-5 |
| Whole Wheat Bulk | 3 | 3.4 | 3.2 | 1-5 |
| Flavors, minerals, vitamins | 1 | 1 | 0.7 | 0.5-1.0 |
| Choline Chloride LQ (liquid) | 0.2 | 0.2 | 0.3 | 0.05-2.0 |
| Propylene Glycol | 16.5 | 16 | 16.5 | 15-17 |
| Grease, Choice White with Lactic Acid | 3 | 3.4 | 3.5 | 2-4 |
| Hydrochloric Acid | 1 | 1 | 1.2 | 0.5-1.5 |
| KnB Meat Slurry (90 wt % beef) | 17.5 | 18 | 17 | 16-19 |
| Caramel Liq 2X | 1.6 | 0 | 1 | 1-2 |
| Red Color Solution | 1.7 | 0 | 1.2 | 1.5-1.9 |
| Sorbic Acid Blend | 2 | 2 | 1.8 | 1.5-2.5 |
| TOTAL | 100 | 100 | 100 | 100 |

In a second extruder, forming a second dough comprising at least one cereal grain, a meal of a legume, and animal-derived protein. The second dough may be formed using any of the formulas set forth in Table 10. The second dough is an expanded dough formed at a temperature in a range of about 215-240° F. Then, co-extruding the first dough wrapped around a second dough to form a co-extrudate, the co-extrudate comprising an inner portion 300 of the first dough and an outer portion 200 of the second dough.

TABLE 10

Ingredient Formulations Used to Form Second Dough

| Ingredient | Formula 1 (wt %) | Formula 2 (wt %) | Formula 3 (wt %) | Ranges (wt %) |
|---|---|---|---|---|
| Corn, Yellow #2 (whole) | 42.4 | 43.5 | 44.2 | 40-45 |
| Soybean Meal (48%) | 29 | 28.4 | 27.3 | 25-30 |
| Beef & Bone Meal | 10 | 9.2 | 8.5 | 8-12 |
| Wheat Midds Bulk | 5.7 | 5.3 | 4.5 | 3-8 |
| Whole Wheat Bulk | 4.8 | 5.4 | 6.1 | 3-8 |
| Flavors, minerals, vitamins | 1.4 | 1.3 | 2 | 0.5-2.5 |
| Choline Chloride LQ (liquid) | 0.3 | 0.3 | 0.2 | 0.1-0.4 |
| Caramel Liq 2X | 2.4 | 2.1 | 3 | 1-4 |
| Hydrochloric Acid | 1 | 1 | 1.1 | 0.5-1.5 |
| Sorbic Acid Blend | 3 | 3.5 | 3.1 | 2-5 |
| TOTAL | 100 | 100 | 100 | 100 |

In various embodiments of the process, the first extruder is a twin-screw extruder, and the second extruder is a single screw extruder, which has a manifold, wherein the process further includes using the manifold to wrap the second dough around the first dough before co-extruding the first dough and the second dough to form a co-extrudate which is cut into pieces of the animal food product 100 with a face cutter or similar cutting device.

In various embodiments, the pieces of the animal food product 100 are air-dried. The animal food product 100 may be further packaged in commercial packaging. Such packaging is shelf stable with the inner portion 300 and the outer portion 200 of the animal food product 100 substantially retaining their individual moisture content after packaging.

While the subject matter has been disclosed with reference to specific embodiments, it will be apparent that other embodiments and variations can be devised by those skilled in the art without departing from the true spirit and scope of the subject matter described herein. The appended claims include all such embodiments and equivalent variations.

What is claimed is:

1. A dual-texture animal food product comprising:
   an outer portion having a first texture with a hardness factor of about 3-10 Newtons,
      the outer portion formed from a first extruded dough comprising:
         whole corn,
         wheat middlings from about 3-8% by weight of the outer portion, the wheat middlings comprising wheat starch having amylose at an average 25% by weight,
         whole wheat from about 3-8% by weight of the outer portion, the whole wheat comprising wheat starch having amylose at an average 25% by weight,
         a legume, and
         an animal-based protein,
      wherein
         the whole corn, the wheat middlings, the whole wheat, and the legume in combination comprise about 75-85% by weight of the outer portion,
         the animal-based protein comprises about 5-10% by weight of the outer portion, and
         the outer portion comprises a moisture content of about 8-12% by weight of the outer portion; and
   an inner portion having a second texture with a hardness factor of about 1-7 Newtons, the inner portion formed from a second extruded dough comprising:
      animal-derived grease,
      lactic acid, and
      meat,
   wherein
      the combination of the animal derived grease and the lactic acid comprises about 3% by weight of the inner portion,
      the meat comprises at about 3% or more by weight of the inner portion, and
      the inner portion having a moisture content of about 11-18% by weight of the inner portion;
   wherein the inner portion is partially surrounded by the outer portion, and
   wherein the hardness factor associated with the inner portion is less than the hardness factor associated with the outer portion.

2. The animal food product of claim 1 having animal-derived grease with lactic acid applied to an external surface of the animal food product.

3. The animal food product of claim 1 wherein the outer portion has a hardness factor of about 3.5-7 Newtons.

4. The animal food product of claim 3 wherein the outer portion has a hardness factor of about 5.5 Newtons.

5. The animal food product of claim 1 wherein the inner portion has a hardness factor of about 1.5-7 Newtons.

6. The animal food product of claim 5 wherein the inner portion has a hardness factor of about 4.5 Newtons.

7. The animal food product of claim 1 wherein the outer portion comprises a moisture content at about 10-12% by weight of the outer portion.

8. The animal food product of claim 7 wherein the outer portion comprises a moisture content at about 12% by weight of the outer portion.

9. The animal food product of claim 1 wherein the inner portion comprises a moisture content of about 15-17% by weight of the inner portion.

10. The animal food product of claim 9 wherein the inner portion comprises a moisture content of about 16% by weight of the inner portion.

11. The animal food product of claim 1 wherein the legume is soybean or soybean meal.

12. The animal food product of claim 1 wherein the meat is beef.

13. The animal food product of claim 1 wherein the outer portion comprises an ingredient selected from the group consisting of a vitamin, a mineral, a flavoring, a preservative, or a combination thereof.

14. The animal food product of claim 1 wherein the inner portion further comprises an ingredient selected from the group consisting of a cereal grain, a legume, a humectant, an acid, a vitamin, a flavoring, or a combination thereof.

15. The animal food product of claim 1 wherein the animal food product is shelf stable.

* * * * *